United States Patent
Nam et al.

(10) Patent No.: US 10,490,868 B2
(45) Date of Patent: Nov. 26, 2019

(54) BATTERY PACK COMPRISING MEMBER OF EDGE COOLING TYPE

(71) Applicant: LG CHEM, LTD., Seoul (KR)

(72) Inventors: Ho Chol Nam, Daejeon (KR); Hyoung Chul Yoon, Daejeon (KR); Dong Hyun Kim, Daejeon (KR); Seog Jin Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/737,820

(22) PCT Filed: Jan. 6, 2017

(86) PCT No.: PCT/KR2017/000235
§ 371 (c)(1),
(2) Date: Dec. 19, 2017

(87) PCT Pub. No.: WO2017/119789
PCT Pub. Date: Jul. 13, 2017

(65) Prior Publication Data
US 2019/0006725 A1    Jan. 3, 2019

(30) Foreign Application Priority Data

Jan. 6, 2016 (KR) .................. 10-2016-0001310

(51) Int. Cl.
*H01M 10/643* (2014.01)
*H01M 10/647* (2014.01)
(Continued)

(52) U.S. Cl.
CPC ....... *H01M 10/647* (2015.04); *H01M 2/0207* (2013.01); *H01M 10/613* (2015.04); *H01M 10/6551* (2015.04); *H01M 10/6554* (2015.04)

(58) Field of Classification Search
CPC ............ H01M 10/647; H01M 2/0207; H01M 2/1061; H01M 10/6551; H01M 10/6554;
(Continued)

(56) References Cited

U.S. PATENT DOCUMENTS

| 9,023,503 B2 | 5/2015 | Seong et al. |
| 2014/0099527 A1* | 4/2014 | Seong ................. H01M 2/1077 429/120 |

(Continued)

FOREIGN PATENT DOCUMENTS

| EP | 2 763 214 A1 | 8/2014 |
| JP | 2003-7355 A | 1/2003 |

(Continued)

OTHER PUBLICATIONS

International Search Report (PCT/ISA/210) issued in PCT/KR2017/000235, dated Apr. 4, 2017.
(Continued)

*Primary Examiner* — Muhammad S Siddiquee
(74) *Attorney, Agent, or Firm* — Birch, Stewart, Kolasch & Birch, LLP

(57) ABSTRACT

A battery pack including: a battery cell assembly in which a plurality of chargeable and dischargeable battery cells are stacked; and a pair of cooling members configured to eliminate heat generated during charging and discharging of the battery cells, wherein the cooling members may include first and second cooling members positioned on first and second surfaces of the battery cell assembly perpendicular to a direction in which the battery cells are stacked, and an inner surface of each of the first cooling member and the second cooling member may be formed with a thermal contact portion with a shape of being in close contact with
(Continued)

an outer surface of each of the first and second surfaces of the battery cell assembly for thermal conduction, is provided.

17 Claims, 7 Drawing Sheets

(51) Int. Cl.
    *H01M 10/6551*     (2014.01)
    *H01M 10/6554*     (2014.01)
    *H01M 2/02*     (2006.01)
    *H01M 10/613*     (2014.01)

(58) Field of Classification Search
    CPC ........... H01M 10/613; H01M 10/6567; H01M 10/6561
    See application file for complete search history.

(56) References Cited

U.S. PATENT DOCUMENTS

| | | | |
|---|---|---|---|
| 2014/0234691 A1* | 8/2014 | Lee | H01M 10/625 429/120 |
| 2015/0064535 A1 | 3/2015 | Seong et al. | |
| 2015/0147622 A1* | 5/2015 | Hwang | H01M 2/1077 429/120 |
| 2017/0309980 A1* | 10/2017 | Hong | H01M 2/10 |

FOREIGN PATENT DOCUMENTS

| | | |
|---|---|---|
| JP | 2004-47262 A | 2/2004 |
| JP | 2008-159440 A | 7/2008 |
| JP | 2013-51099 A | 3/2013 |
| JP | 2014-534597 A | 12/2014 |
| JP | 2015-158976 A | 9/2015 |
| KR | 10-2007-0051446 A | 5/2007 |
| KR | 10-1307992 B1 | 9/2013 |
| KR | 10-2013-0120261 A | 11/2013 |
| KR | 10-2013-0123901 A | 11/2013 |
| KR | 10-2014-0011439 A | 1/2014 |
| KR | 10-2014-0057701 A | 5/2014 |
| KR | 10-2015-0000725 A | 1/2015 |
| KR | 10-2015-0047373 A | 5/2015 |
| WO | WO 2008/078586 A1 | 7/2008 |
| WO | WO 2013/031406 A1 | 3/2013 |

OTHER PUBLICATIONS

Written Opinion (PCT/ISA/237) issued in PCT/KR2017/000235, dated Apr. 4, 2017.
European Search Report for Appl. No. 17736161.5 dated Jun. 13, 2018.

* cited by examiner

Prior Art

Prior Art

BATTERY PACK COMPRISING MEMBER OF EDGE COOLING TYPE

TECHNICAL FIELD

This application claims the benefit of Korean Patent Application No. 10-2016-0001310 on Jan. 6, 2016 with the Korean Intellectual Property Office, the disclosure of which is herein incorporated by reference in its entirety.

The present invention relates to a battery pack in which a thermal contact portion for thermal conduction is formed on an inner surface of a cooling member.

BACKGROUND ART

Recently, a rechargeable battery that can be repeatedly charged and discharged has been variously used as an energy source of a wireless mobile device. In addition, the rechargeable battery has attracted attention as an energy source of an electric vehicle (EV), a hybrid electric vehicle (HEV), a plug-in hybrid electric vehicle (PHEV), and the like, which have been proposed as a solution to solve air pollution from conventional gasoline vehicles and diesel vehicles using fossil fuels.

In small-sized mobile devices, one or more battery cells are used per device, while in middle- or large-sized devices such as vehicles, a middle- or large-sized battery pack in which a large number of battery cells are electrically connected is used due to necessity of high output and large capacity.

Since it is preferable that the middle- or large-sized battery pack is manufactured with as small a size and as light a weight as possible, a prismatic battery, a pouch-type battery, and the like, which may be stacked with a high degree of integration and have light weight compared to capacity, are mainly used as a battery cell of the middle- or large-sized battery pack. Particularly, recently, a pouch-type battery using an aluminum laminate sheet or the like as an exterior member has attracted a great deal of attention due to its advantages such as light weight, low manufacturing cost, and easy shape modification.

Since the battery cells included in the middle- or large-sized battery pack are rechargeable batteries, a high-output large-capacity rechargeable battery generates a large amount of heat during a charging and discharging process. Particularly, since the laminate sheet of the pouch-type battery widely used in the battery pack is coated with a polymer material having low thermal conductivity, it is difficult to effectively reduce a temperature of all of the battery cells.

When heat generated during the charging and discharging process is not effectively eliminated, heat accumulation may occur, which may accelerate deterioration of the battery cell and possibly cause ignition or explosion. Therefore, the high-power large-capacity battery pack requires a cooling system for cooling the battery cells included in the battery pack.

Generally, the battery pack is manufactured by very densely stacking a plurality of battery cells, and adjacent battery cells are stacked to be spaced apart from each other by a predetermined interval so as to remove heat generated during charging and discharging. For example, the battery cells themselves may be sequentially stacked while being spaced apart from each other by a predetermined interval without a separate member, or when the battery cells have low mechanical rigidity, they may be accommodated in a cartridge or the like in a combination of one or more, and then a plurality of such cartridges may be stacked to form the battery pack.

Conventionally, a coolant channel is formed between the battery cells so as to effectively eliminate the heat generated between the stacked and arranged battery cells, or after forming cooling fins between the battery cells, the heat generated in the battery cells is cooled by an air-cooling or water-cooling method from the cooling member mounted on the outside of the battery pack through the cooling fins.

FIG. 1 illustrates a schematic view of a structure of a conventional battery pack 100, and FIG. 2 illustrates a top plan view of a battery pack of FIG. 1 of a cooling type. In the conventionally battery pack 100, cooling fins 20a, 20b, 20c, and 20d are interposed between stacked battery cells 10a, 10b, 10c, 10d, and 10e.

However, when the cooling fins 20a, 20b, 20c, and 20d are interposed between the battery cells 10a, 10b, 10c, 10d, and 10e, the number of components is increased, and a process such as welding or fastening between the cooling fins and the cooling member is added, whereby weight of the battery pack may be increased. In addition, since the cooling fins and the cooling members are thermally coupled to each other with a heat radiation pad therebetween and the cooling member is formed with a coolant channel, manufacturing cost is increased and a manufacturing process is complicated.

Since the cooling fins 20a, 20b, 20c, and 20d are interposed between the battery cells 10a, 10b, 10c, 10d, and 10e, a thickness of the battery pack 100 increases, and heat radiation efficiency is not particularly high as compared with an area in which the cooling fin 20a and the battery cell 10a are in contact with each other.

Therefore, there is a high need for a battery pack capable of eliminating the cooling fins while providing high-power large-capacity power, obtaining a heat radiating effect equivalent to conventional cooling efficiency, and reducing the thickness and the weight of the battery pack.

DISCLOSURE

Technical Problem

The present invention has been made to solve the above-mentioned problems of the prior art and conventional technical problems.

The inventors of the present application conducted intensive research and various experiments. As described later, it can be confirmed that it is possible to provide a lightweight battery pack by securing a heat radiating effect equivalent to a cooling method performed by a conventional cooling fin by a cooling member formed with a thermal contact portion having a specific shape, by reducing a thickness of a battery pack, and by minimizing weight thereof. Thus, the present invention was accomplished.

Technical Solution

The present invention has been made in an effort to provide a battery pack including:

a battery cell assembly in which a plurality of chargeable and dischargeable battery cells are stacked; and a pair of cooling members configured to eliminate heat generated during charging and discharging of the battery cells, wherein the cooling members include first and second cooling members positioned on first and second surfaces of the battery cell assembly perpendicular to a direction in which the battery cells are stacked, and an inner surface of each of the first cooling member and the second cooling member is formed with a thermal contact portion with a shape of being in close contact with an outer surface of each of the first and second surfaces of the battery cell assembly for thermal conduction.

In a case of the battery cell having a structure in which a separation layer is respectively stacked on each anode and each cathode, thermal conductivity in a lateral direction of the battery cell is higher than that in a surface direction thereof by about 10 times or more.

Therefore, since the battery pack according to the present invention has the shape in which the thermal contact portions formed on respective inner surfaces of the first cooling member and the second cooling member are in close contact with respective outer surfaces of the first and second surfaces of the battery cell assembly, it is possible to greatly increase heat radiation efficiency. That is, a surface area for the thermal conduction is reduced compared with the conventional cooling method, but since the thermal conduction efficiency is greatly increased by the thermal conduction in the lateral direction, it is possible to secure a heat radiating effect equivalent to that of the conventional cooling method in which cooling is performed in the surface direction by the cooling fin.

In addition, the battery pack of the present invention in which the cooling fins are eliminated may be weight-reduced by reducing the number of parts used for fastening the cooling fins and the cooling members, and since a space for mounting the cooling fins is not required, it is possible to reduce a thickness of the battery pack.

In the battery pack according to the present invention, the heat generated in the charging and discharging process of the battery cell may be heat-conducted to the first and second cooling members respectively positioned on the first and second surfaces of the battery cell assembly through opposite side end portions of the battery cell, and may thereby be eliminated.

In an exemplary embodiment, the battery cells may be stacked and arranged to form the battery cell assembly in a state in which adjacent battery cells directly face each other.

In the above-described structure, the thermal contact portion of the cooling member may have a shape and structure in which opposite side end portions of the battery cells are inserted therein and are in close contact therewith. That is, a shape of the opposite side end portions of the battery cell may vary depending on the type of the battery cell, but the thermal contact portion has a structure in which the opposite side end portions of the battery cells are inserted therein and are in close contact therewith for high thermal conduction. Further, the structure may assist in accurately mounting the battery cell on the cooling member.

The battery cell used in the battery pack of the present invention may be various. For example, the battery cell may be a pouch-type battery cell in which an electrode assembly is embedded in an accommodating portion of a pouch-type battery case and an outer periphery of the accommodating portion is formed of a heat fusion sealing portion.

In such a battery cell structure, the thermal contact portion of the cooling member is formed to have a shape that allows the heat fusion sealing portion of the pouch-type battery cell and an outer lateral wall of the accommodating portion adjacent to the heat fusion sealing portion to be in close contact with each other.

The outer lateral wall of the accommodating portion may be inclined at a predetermined angular degree, for example, 90 to 130 degrees with respect to the heat fusion sealing portion, but since the outer wall may vary according to a shape of the accommodating portion of the pouch-type battery case, the present invention is not limited thereto.

However, the thermal contact portion is brought into close contact not only with the heat fusion sealing portion of the pouch-type battery cell but also with the outer lateral wall of the accommodating portion adjacent to the heat fusion sealing portion, thus heat generated in the electrode assembly mounted in the accommodating portion may be more effectively eliminated.

The battery pack of the present invention may have a structure in which one or more battery cells are mounted on a cell cover to form a unit module, and unit modules are stacked to form a battery cell assembly.

Since the unit module is formed to have a structure in which, for example, two battery cells are embedded in a cell cover thereof made of a metal material, it is possible to secure safety of the battery cell having low mechanical rigidity.

In such a structure, the thermal contact portion of the cooling member may be formed to have a structure in which the opposite side end portions of the unit modules are inserted therein and are in close contact therewith.

In another exemplary embodiment, at least some of the battery cell, while being exposed on the first and second surfaces of the battery cell assembly, is mounted on a cartridge, and cartridges on which one or more battery cells are mounted are stacked and arranged to form the battery cell assembly.

Specifically, the battery cell may be a pouch-type battery cell in which the electrode assembly is embedded in an accommodating portion of the pouch-type battery case, the outer periphery of the accommodating portion may be formed to have the heat fusion sealing portion, and an end portion of the heat fusion sealing portion may be mounted on the cartridge while being exposed on the first surface and the second surface of the battery cell assembly.

In such a structure, the thermal contact portion of the cooling member may be formed to have a shape in which the exposed end portion of the heat fusion sealing portion and an outer lateral wall of the cartridge at which the heat fusion sealing portion is positioned are in close contact with each other.

In an exemplary embodiment, the thermal conduction member configured to improve thermal conduction may be additionally disposed at an interface between the thermal contact portion of the cooling members and the battery cell assembly. Since the thermal conduction member eliminates air existing at the interface between the thermal contact portion and the battery cell assembly, it is possible to obtain an effect of increasing thermal conductivity.

In order to effectively obtain the above effect, the thermal conduction member may be made of one of a thermally conductive resin, a thermally conductive film, and a thermally conductive pad, but the present invention is not limited thereto.

In the battery pack according to the present invention, the cooling member may have an air-cooling type of cooling structure or a water-cooling type of cooling structure.

For example, the air-cooling type of cooling structure may be realized to have a structure in which air contacts the outer surface of the cooling member, and for this, a concavo-convex structure may be formed on the outer surface of the cooling member to provide a wide contact area.

For example, the water-cooling type of cooling structure may be realized to have a structure in which a coolant such as water contacts the outer surface of the cooling member, or the coolant passes through the cooling member.

In some exemplary embodiments, a composite cooling structure in which an air-cooling type of cooling structure and a water-cooling type of cooling structure are combined may be possible, and these are to be construed as falling within the scope of the present invention.

The present invention also provides a device using the battery pack as a power source.

Advantageous Effects

A kind of the device is not particularly limited, and for example, the device may include a mobile electronic device, a power tool powered by a battery-based motor, an electric vehicle including an electric vehicle (EV) and a hybrid electric vehicle (HEV), an electric motorcycle including an electric bike (E-bike) and an electric scooter (E-scooter), an electric golf cart, and a power storage system.

In addition, since the battery pack according to the present invention has high thermal conduction efficiency with respect to a unit area, it may be used as a power source for a small device requiring a high current (continuous 8C) discharge such as a drone.

The various devices using the battery pack as a power source are well known in the art, so a detailed description thereof will be omitted herein.

MODE FOR INVENTION

Hereinafter, an exemplary embodiment of the present invention is described with reference to the drawings, but the scope of the present invention is not limited thereto.

Figure 1:
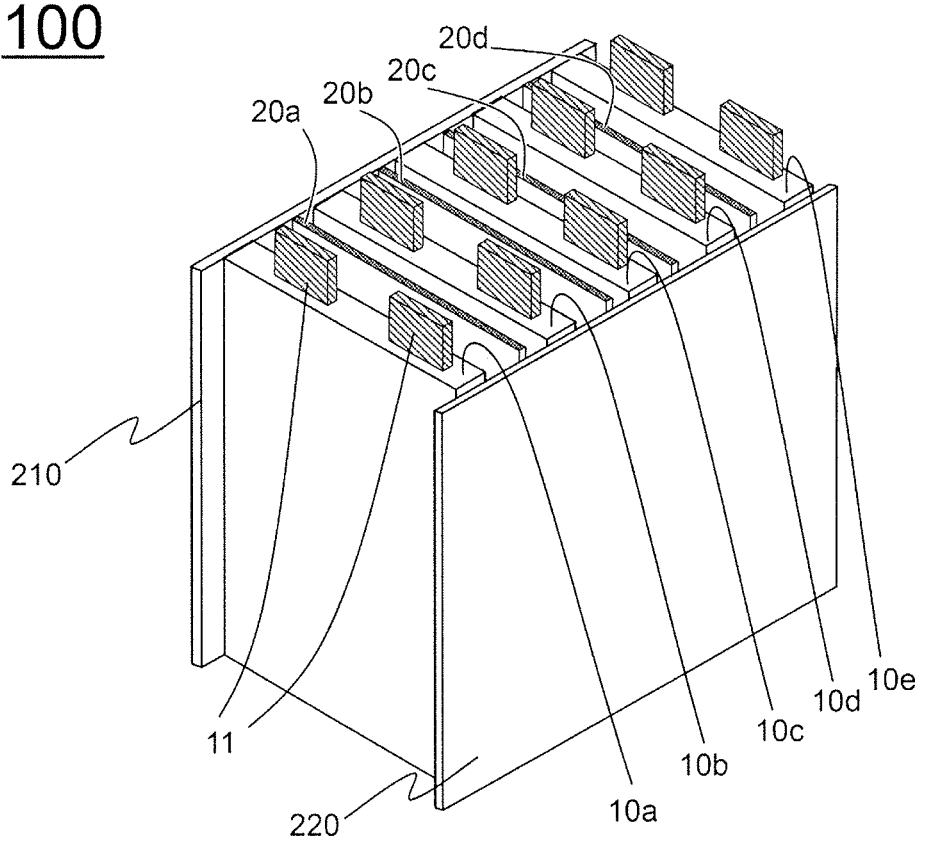
FIG. 1 illustrates a schematic view of a structure of a conventional battery pack.
Figure 2:
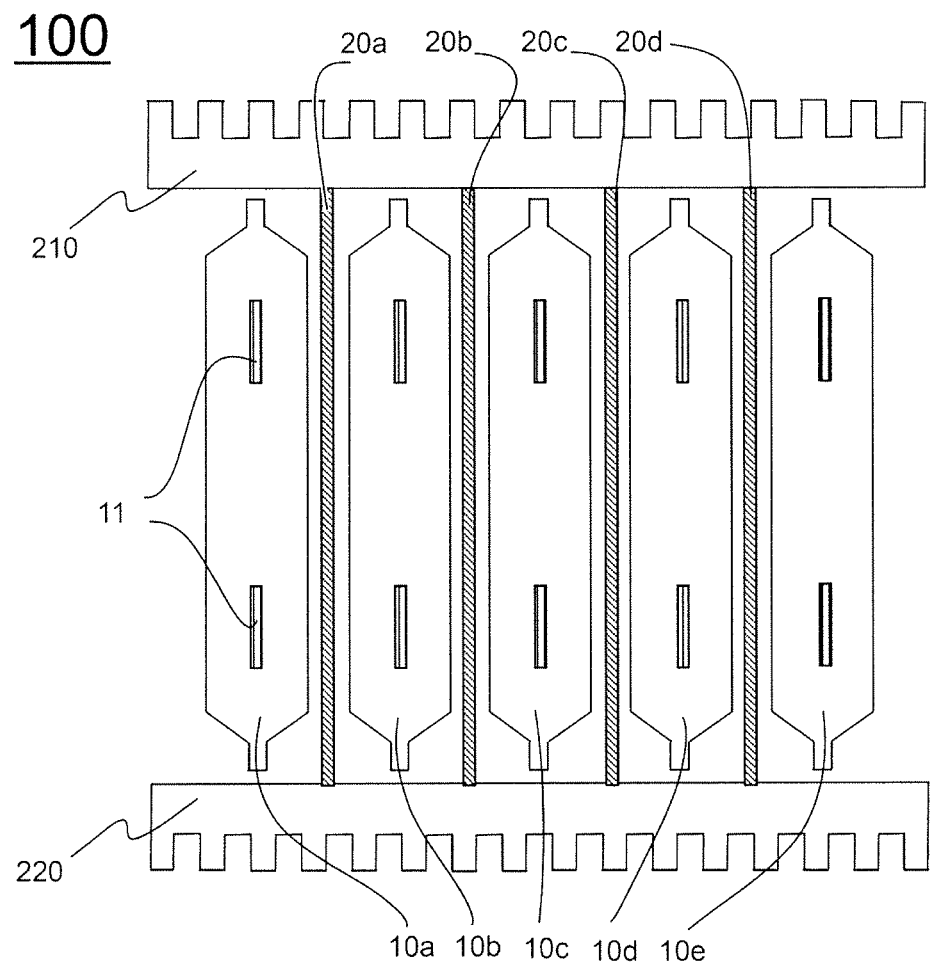
FIG. 2 illustrates a top plan view of a battery pack with a cooling type of FIG. 1.
Figure 3:
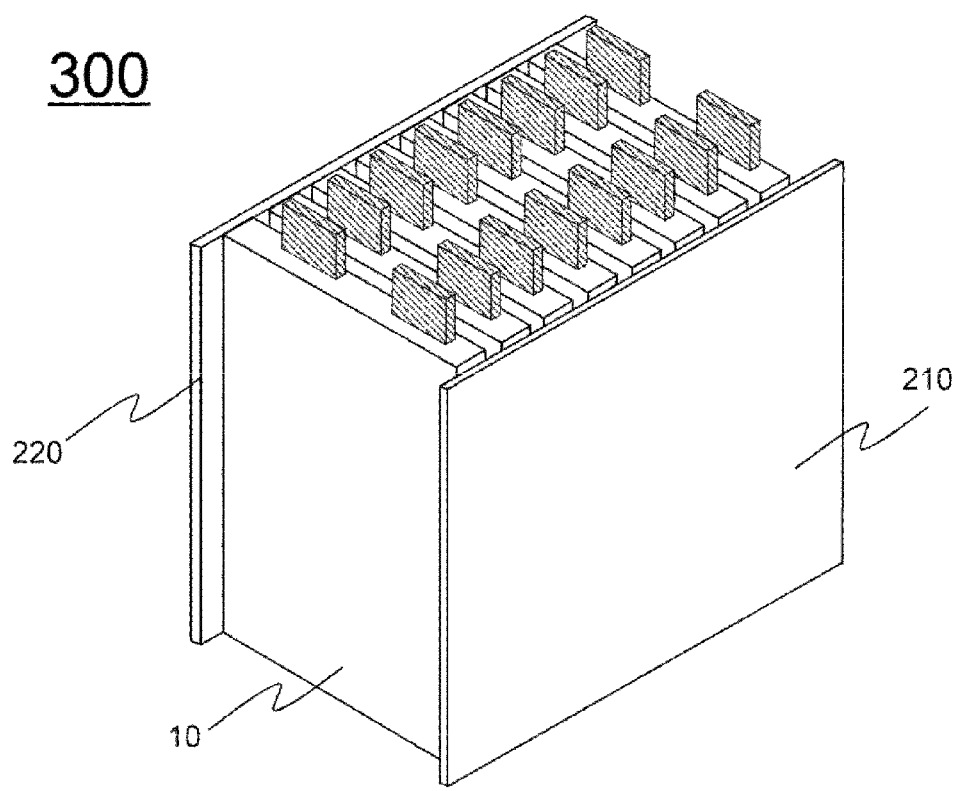
FIG. 3 illustrates a schematic view of a structure of a battery pack according to an exemplary embodiment of the present invention.
Figure 4:
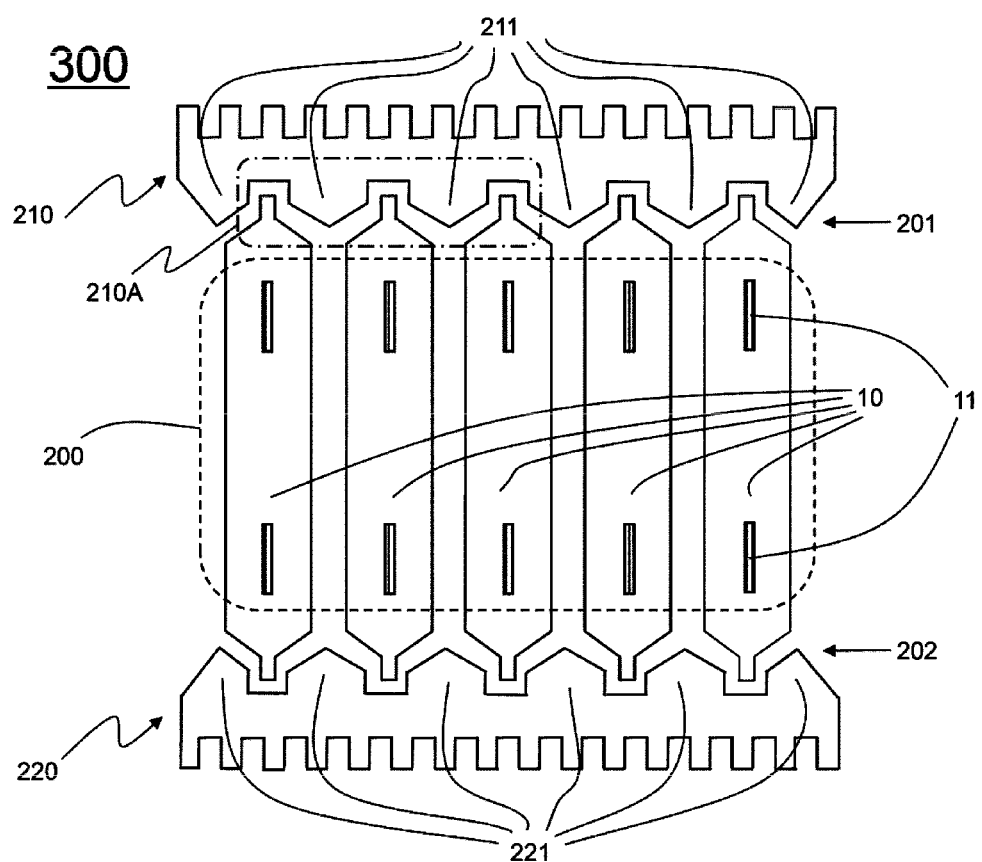
FIG. 4 illustrates a top plan view of a battery pack according to an exemplary embodiment of the present invention.

FIG. 3 illustrates a schematic view of a structure of a battery pack according to an exemplary embodiment of the present invention, and FIG. 4 illustrates a top plan view of the battery pack of FIG. 3.

Referring to FIG. 3 and FIG. 4, a battery pack 300 includes a battery cell assembly 200 in which a plurality of battery cells 10 are stacked while directly facing each other, and cooling members 210 and 220 positioned to be perpendicular to a stacking direction of the battery cells.

A first surface 201 and a second surface 202 of the battery cell assembly 200 perpendicular to the stacking direction of the battery cells 10 are positioned to face each other based on an electrode terminal 11 of the battery cells. The cooling members 210 and 220 include a first cooling member 210 and a second cooling member 220 respectively positioned at the first surface 201 and the second surface 202 of the battery cell assembly 200. By such a structure, the heat generated from the battery cells 10 is heat-conducted to the opposite side end portions of the battery cells 10, that is, the first cooling member 210 and the second cooling member 220 respectively positioned at the first surface 201 and the second surface 202 of the battery cell assembly 200, and is eliminated.

Thermal contact portions 211 and 221 being in close contact with respective outer surfaces of the first surface 201 and the second surface 202 of the battery cell assembly 200 are formed at the first cooling member 210 and the second cooling member 220. The thermal contact portions 211 and 221 face each other with the battery cell assembly 200 therebetween, and the thermal contact portion 211 formed at the first cooling member 210 and the thermal contact portion 221 formed at the second cooling member 220 respectively protrude in directions of the second cooling member 220 and the first cooling member 210. As the thermal contact portions 211 and 221 and the first surface 201 and the second surface 202 of the battery cell assembly 200 are closely contacted with each other, the thermal conductivity increases, thereby improving the heat radiation efficiency.

Figure 5:
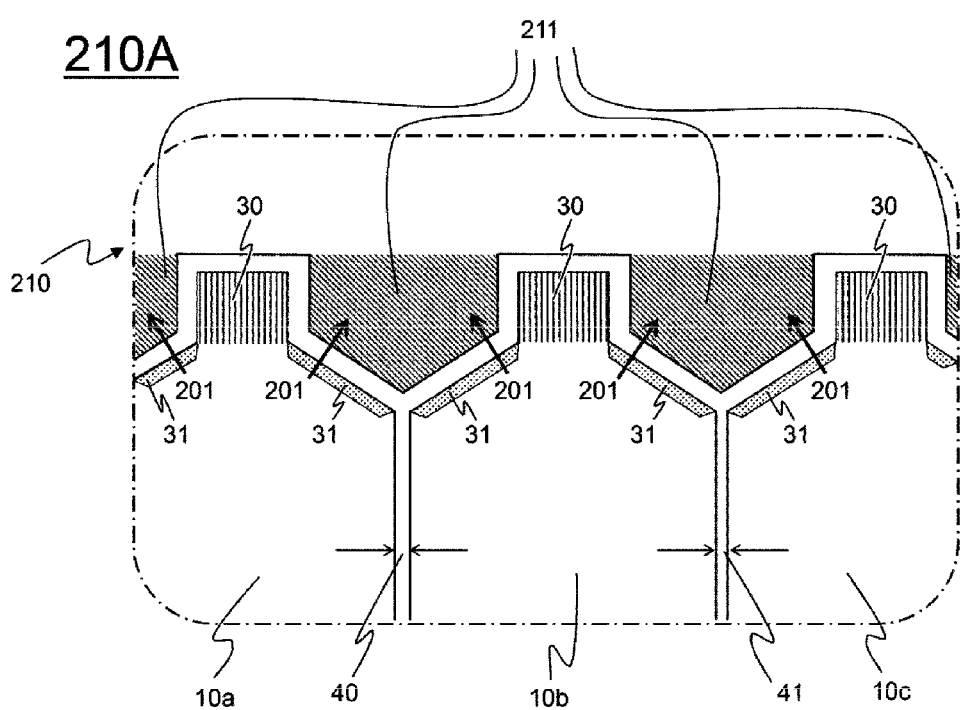
FIG. 5 illustrates an enlarged view of a structure in which a thermal contact portion of a cooling member and an outer surface of a first surface of a battery cell assembly are in close contact with each other.

FIG. 5 illustrates an enlarged view of a structure in which a thermal contact portion of a cooling member and an outer surface of a first surface of a battery cell assembly are in close contact with each other.

Referring to FIG. 5, the thermal contact portion 211 having a shape of being inserted into an end portion of the battery cell positioned at the first surface 201 of the battery cell assembly 200 is shown.

The end portion of the battery cell 10a positioned at the first surface 201 of the battery cell assembly 200 is formed of a heat fusion sealing portion 30 of the accommodating portion of the pouch-type battery case, and an outer lateral wall 31 of the accommodating portion.

The heat fusion sealing portion 30 faces the first cooling member 210 in a direction perpendicular to an arrangement direction of the battery cells 10a, 10b, and 10c, and it has a shape protruding more than the outer lateral wall 31 of the accommodating portions positioned at adjacent opposite sides thereof.

The outer lateral wall 31 of the accommodating portion is inclined at an angle of 90 to 130 degrees with respect to the outer side except the outer side thereof facing the heat fusion sealing portion 30 and the first cooling member 210.

Since the thermal contact portion 211 is formed to have a shape to be inserted into and be in close contact with the heat fusion sealing portion 30 and the outer lateral wall 31 of the accommodating portion having the above-described structures, it is possible to increase the thermal conductivity and accurately mount the battery cells 10a, 10b, and 10c on the cooling member 210.

Specifically, since the thermal contact portion 211 is positioned in the lateral direction on the end portion of the battery cell 10a and the thermal conductivity in the lateral direction of the battery cell is about 10 times higher than that in the surface direction, the battery pack according to the present invention may achieve high heat radiation efficiency with respect to the area in which the heat conduction is performed.

Since it is not necessary to provide a separate space for interposing the cooling fin between the battery cells 10*a*, 10*b* and 10*c* in the structure described above, gaps 40 and 41 between the battery cells 10*a*, 10*b*, and 10*c* are reduced, thus it is possible to manufacture the battery pack 300 having a thin thickness and high power and large capacity, and it is possible to minimize the weight of the battery pack by reducing the number of parts used for fastening the cooling fin and the cooling member.

Figure 6:
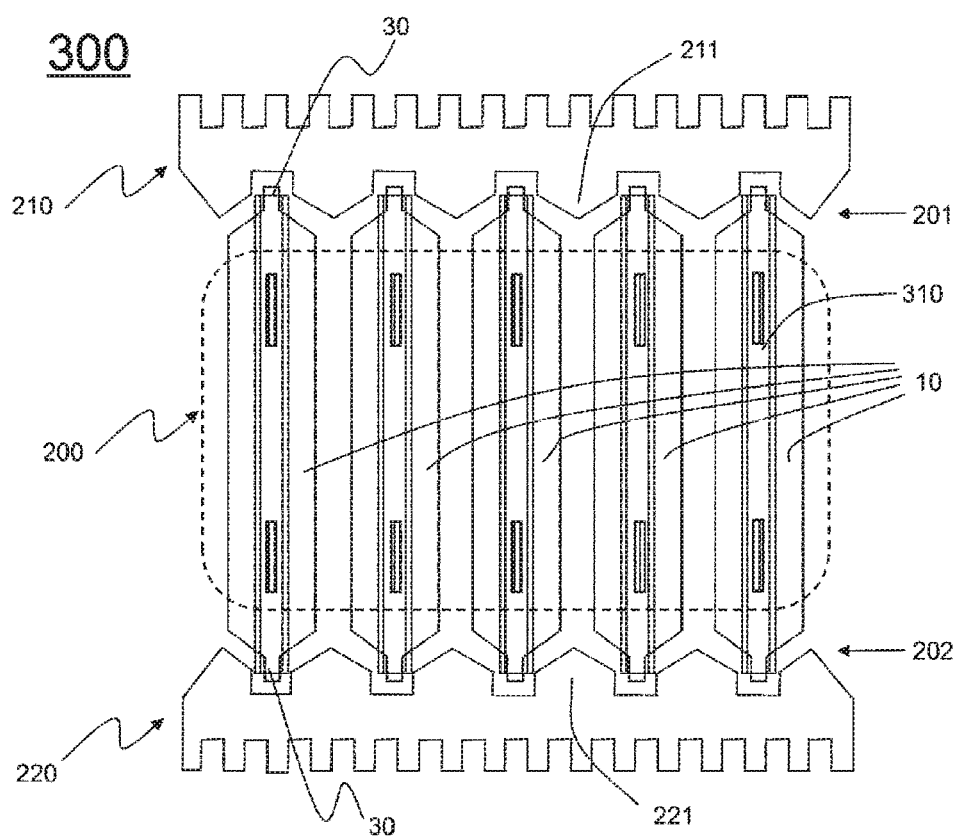
FIG. 6 illustrates a cross-sectional view of a battery pack in which a battery cell according to an exemplary embodiment of the present invention is mounted on a cartridge.

FIG. 6 illustrates a cross-sectional view of a structure in which some of battery cells of a battery pack according to an exemplary embodiment of the present invention are mounted on a cartridge.

Since the pouch-type battery cells have low mechanical rigidity, they may be respectively embedded in cartridges in a combination of one or more, and then the cartridges are stacked, thereby improving the mechanical rigidity.

In the pouch-type battery cell 10, the electrode assembly is embedded in the accommodating portion of the pouch-type battery case, and the heat fusion sealing portion 30 is formed at the external periphery of the accommodating portion. In a state in which the battery cells 10 is mounted on a cartridge 310, an end portion of the heat fusion sealing portion 30 is exposed on the first surface 201 and the second surface 202 of the battery cell assembly. Since the heat generated in the charging and discharging process of the pouch-type battery cells 10 is heat-conducted to the first cooling member 210 and the second cooling member 220 through the exposed end portion of the heat fusion sealing portion 30, a heat radiating effect may be obtained.

Figure 7:
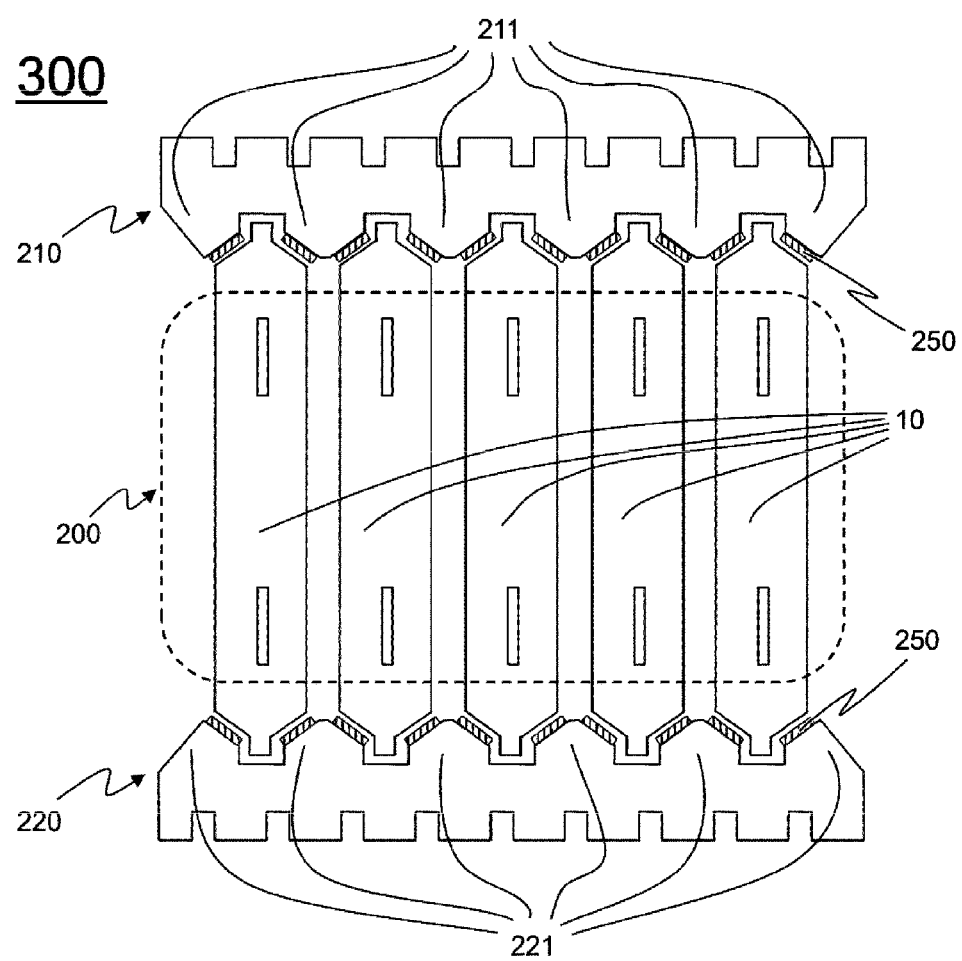
FIG. 7 illustrates a schematic view of a structure in which a thermal conduction member is disposed at an interface between thermal contact portions of cooling members and a battery cell assembly.

FIG. 7 illustrates a schematic view of a structure in which a thermal conduction member is disposed at an interface between thermal contact portions of cooling members and a battery cell assembly.

The thermal conduction member 250 is disposed at the interface of the battery cell assembly 200 such that the heat generated during charging and discharging of the battery cells 10 may be conducted to the cooling members 210 and 220 to be cooled. In addition, since air has very low thermal conductivity, it is possible to obtain an effect of increasing the thermal conductivity by eliminating the air existing between the thermal contact portion 211 and the battery cell assembly 200.

The accompanying drawings and the detailed description of the invention are only illustrative, and are used for the purpose of describing the present invention but are not used to limit the meanings or scope of the present invention described in the claims. Therefore, those skilled in the art will understand that various modifications and other equivalent embodiments of the present invention are possible.

As described above, according to the battery pack of the present invention, by forming the thermal contact portion having the shape of being in close contact with respective outer surfaces of the first and second surfaces of the battery cell assembly in the inner surfaces of the cooling members respectively positioned at the first and second surfaces of the battery cell assembly that are perpendicular to the direction in which the battery cells are stacked, it is possible to provide a lightweight battery pack by securing the heat radiating effect equivalent to the cooling method performed by the conventional cooling fins, by reducing the thickness of the battery pack, and by minimizing the weight thereof.

The invention claimed is:

1. A battery pack comprising:
a battery cell assembly in which a plurality of chargeable and dischargeable battery cells are stacked in a first direction, wherein each of the battery cells are provided with first and second longitudinal ends extending in a second direction, the second direction being perpendicular to the first direction; and
first and second cooling members configured to eliminate heat generated during charging and discharging of the battery cells,
wherein the first and second cooling members are positioned on the first and second longitudinal ends of each of the battery cells,
wherein an inner surface of each of the first cooling member and the second cooling member is formed with a thermal contact portion, wherein each thermal contact portion has a plurality of recessed portions, each recessed portion having a shape substantially similar to a shape of the longitudinal end of the respective battery cell and being in close contact with the longitudinal end of the respective battery cell for thermal conduction, and
wherein each longitudinal end of each battery cell comprises:
a substantially planar heat fusion sealing portion extending into the respective recessed portion; and
an outer lateral wall that is inclined with respect to the heat fusion sealing portion.

2. The battery pack of claim 1, wherein
the battery cells are stacked and arranged to form the battery cell assembly in a state in which adjacent battery cells directly face each other.

3. The battery pack of claim 2, wherein
each battery cell is a pouch-type battery cell in which an electrode assembly is embedded in an accommodating portion of a pouch-type battery case, and an outer periphery of the accommodating portion is formed of the heat fusion sealing portion.

4. The battery pack of claim 1, wherein
the outer lateral wall is inclined at an angle of 90 to 130 degrees with respect to the heat fusion sealing portion.

5. The battery pack of claim 1, wherein
the battery cells are mounted on a cell cover to form a unit module, and unit modules are stacked and arranged to form the battery cell assembly.

6. The battery pack of claim 5, wherein
the unit module is formed to have a structure in which two battery cells are embedded in a cell cover thereof made of a metal material.

7. The battery pack of claim 5, wherein
the thermal contact portion of each cooling member is forming to have a structure in which opposite side end portions of the unit modules are inserted therein and are in close contact therewith.

8. The battery pack of claim 1, wherein
cartridges on which the battery cells are mounted are stacked and arranged to form the battery cell assembly.

9. The battery pack of claim 8, wherein
each battery cell is a pouch-type battery cell in which the electrode assembly is embedded in an accommodating portion of the pouch-type battery case, the outer periphery of the accommodating portion is formed to have the heat fusion sealing portion, and an end portion of the heat fusion sealing portion is mounted on the cartridge while being exposed on the first and second longitudinal ends.

10. The battery pack of claim 1, wherein
each thermal conduction member is a thermally conductive resin, a thermally conductive film, or a thermally conductive pad.

11. The battery pack of claim 1, wherein
each cooling member has an air-cooling type of cooling structure.

12. The battery pack of claim 1, wherein
each cooling member has a water-cooling type of cooling structure.

13. A device including the battery pack of claim 1.

14. The device of claim 13, wherein
the device is a mobile electronic device, a power tool powered by a battery-based motor, an electric vehicle including an electric vehicle (EV) and a hybrid electric vehicle (HEV), an electric motorcycle including an electric bike (E-bike) and an electric scooter (E-scooter), an electric golf cart, and a power storage system.

15. The battery pack of claim 1, wherein each recessed portion includes two inclined surfaces having substantially the same shape as the respective outer lateral wall.

16. The battery pack of claim 1, wherein each heat fusion sealing portion is positioned at a longitudinal outermost position of the respective battery cell, and
wherein each outer lateral wall is spaced from the longitudinal outermost position of the respective battery cell and is adjacent to the respective heat fusion sealing portion.

17. The battery pack of claim 1, wherein each recessed portion includes two inclined surfaces having substantially the same shape as the respective outer lateral wall,
wherein each heat fusion sealing portion is positioned at a longitudinal outermost position of the respective battery cell, and
wherein each outer lateral wall is spaced from the longitudinal outermost position of the respective battery cell and is adjacent to the respective heat fusion sealing portion.

* * * * *